(12) United States Patent
Yoshida

(10) Patent No.: US 6,332,162 B1
(45) Date of Patent: Dec. 18, 2001

(54) DATA PROCESSING APPARATUS WITH COMMUNICATION FUNCTION

(75) Inventor: Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/906,158

(22) Filed: Aug. 5, 1997

Related U.S. Application Data

(63) Continuation of application No. 08/324,990, filed on Oct. 18, 1994, now abandoned.

(30) Foreign Application Priority Data

Oct. 19, 1993 (JP) .................................................. 5-284298
Oct. 11, 1994 (JP) .................................................. 6-271750

(51) Int. Cl.[7] .................................................. G06F 15/16
(52) U.S. Cl. .......................... 709/228; 709/310; 709/201
(58) Field of Search .................................. 395/115, 156, 395/116, 100; 378/141; 358/468, 440, 296; 379/67; 375/377; 370/32.1, 60; 709/228, 310, 201

(56) References Cited

U.S. PATENT DOCUMENTS

| | | | |
|---|---|---|---|
| 4,729,035 | * | 3/1988 | Tanioka . |
| 4,887,164 | | 12/1989 | Takahashi .............................. 358/443 |
| 4,897,855 | * | 1/1990 | Acambora . |
| 4,916,607 | | 4/1990 | Teraichi et al. ....................... 364/200 |
| 5,062,104 | * | 10/1991 | Lubarsky et al. ....................... 370/60 |
| 5,072,303 | * | 12/1991 | Silverberg ............................. 358/296 |
| 5,182,796 | * | 1/1993 | Shibayama et al. .................. 395/156 |
| 5,276,770 | * | 1/1994 | Kumagai .............................. 395/100 |
| 5,307,179 | * | 4/1994 | Yoshida ............................... 358/440 |
| 5,311,573 | * | 5/1994 | Otsuki .................................... 379/67 |
| 5,351,134 | * | 9/1994 | Yaguchi et al. . |
| 5,452,289 | * | 9/1995 | Sharma et al. ...................... 370/32.1 |
| 5,530,792 | * | 6/1996 | Ikeda et al. .......................... 395/115 |
| 5,586,151 | * | 12/1996 | Minagawa ............................ 375/377 |
| 5,815,280 | * | 9/1998 | Ohmura et al. ...................... 358/296 |
| 5,854,888 | * | 12/1998 | Ishikawa et al. ..................... 395/116 |
| 5,917,615 | * | 6/1999 | Reifman et al. ..................... 358/468 |
| 5,978,097 | * | 11/1999 | Ueno ................................... 358/407 |

OTHER PUBLICATIONS

Microsoft, Microsoft Windows User's Guide, 1990 pp. 143–194, 202–203, 480–482.*

* cited by examiner

*Primary Examiner*—Zarni Maung
(74) *Attorney, Agent, or Firm*—Fitzpatrick, Cella, Harper & Scinto

(57) ABSTRACT

A data processor simultaneously executes data processing and data communication, by properly adjusting the throughputs of both processes, according to the intention of a user. In case the selected throughput of the data processing becomes difficult to secure, a controller lowers the throughput of the data communication. Also, in case the throughput of the data processing becomes difficult to secure even when the throughput of the data communication is lowered by the controller, the user is asked whether the throughput of the data processing can be lowered, and, in response to an affirmative answer by the user, the throughput of the data processing is lowered.

9 Claims, 18 Drawing Sheets

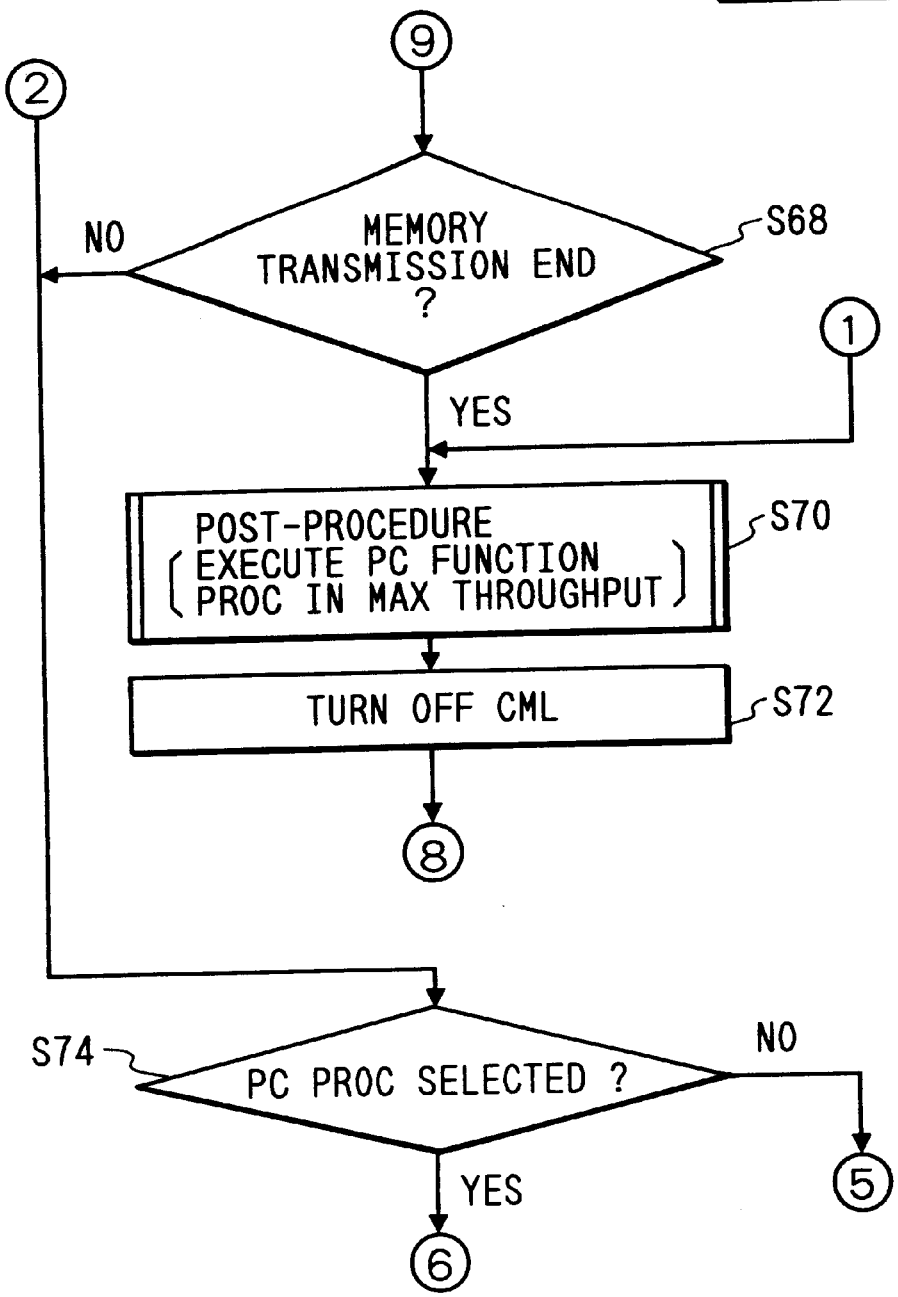

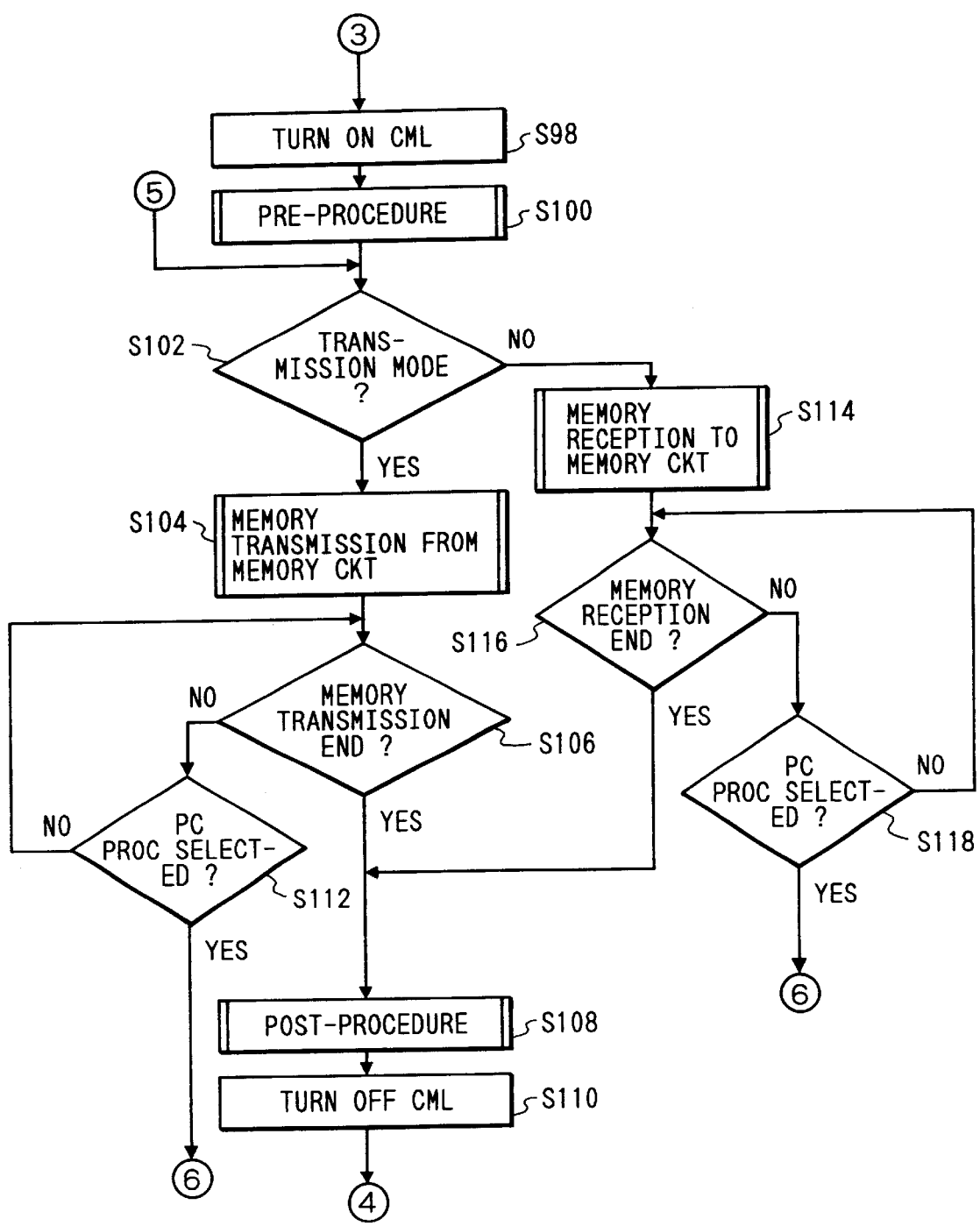

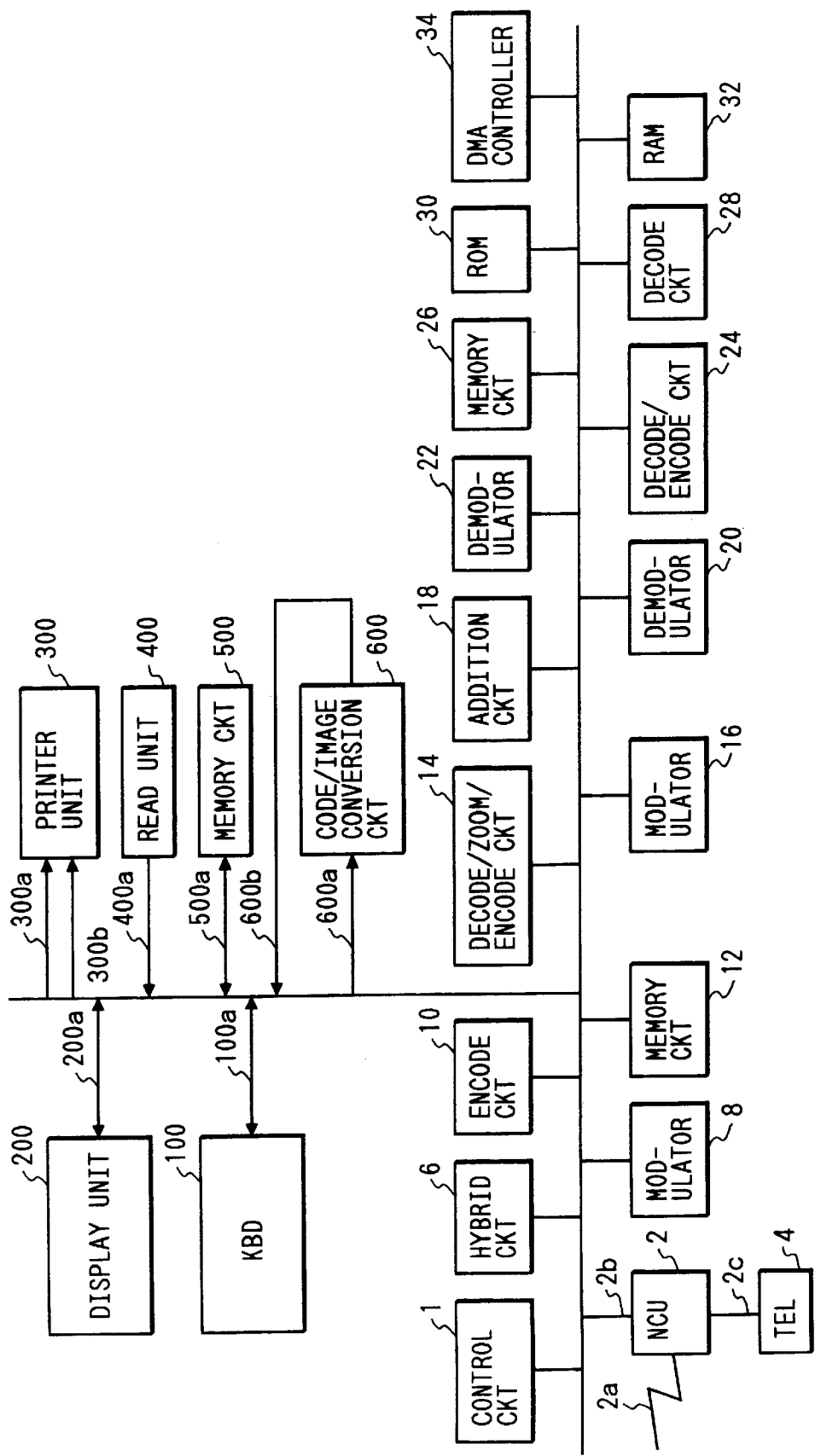

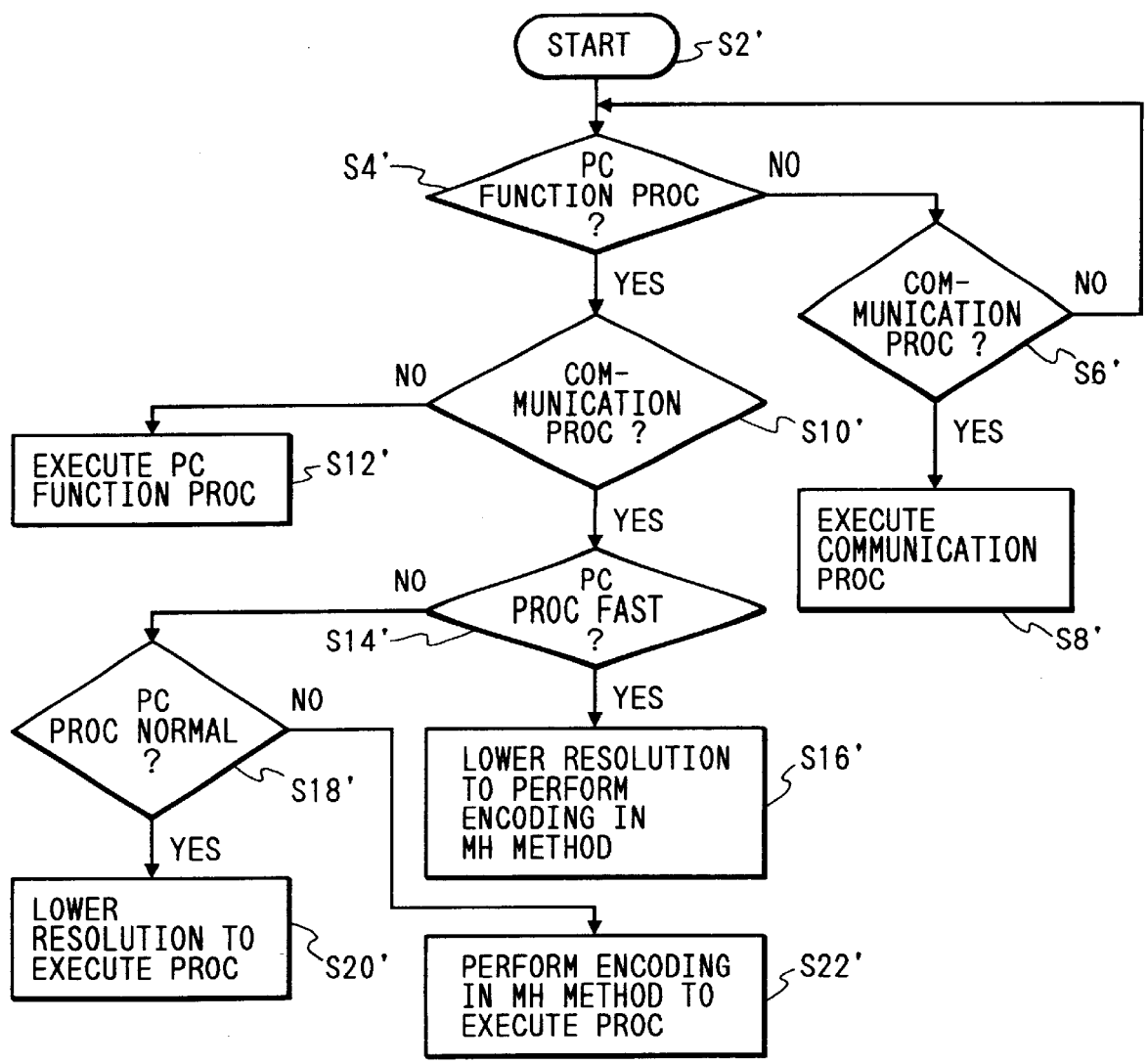

DATA PROCESSING APPARATUS WITH COMMUNICATION FUNCTION

This application is a continuation of application Ser. No. 08/324,990 filed Oct. 18, 1994, now abandoned.

BACKGROUND OF THE INVENTION

1. Field of the Invention

The present invention relates to an apparatus for data processing, and more particularly to a data processing apparatus with a communicating function, capable of data communication through a communication channel simultaneously with data processing.

2. Related Background Art

Personal computers have been widely employed as an example of the data processing apparatus for various data processing such as calculations. Also there have recently been realized personal computers provided with a communicating function for communication of various data for example through a communication channel, in addition to the ordinary data processing function.

Such conventional personal computers with a communicating function can simultaneously execute the data communication by the communicating function and the data processing by the processing function, and, if the current throughput of data processing becomes difficult to secure due to the execution of data communication, the throughput of data processing is lowered in order to give priority to the communicating function.

Consequently, when the throughput of the data processing function is lowered, for example, by a data receiving operation to the memory by the communicating function while the user utilizes the data processing function for an urgent job, the user becomes annoyed by such loss of throughput, and the job by such data processing function is not completed within the anticipated time.

Also jobs utilizing the data processing function naturally include urgent ones and non-urgent ones, but it has not been possible to arbitrarily select the throughput of such data processing function.

Furthermore, if a process utilizing the data processing function integrally includes, for example, data storage to the memory, there has inevitably been encountered a loss in performance of the communicating function.

SUMMARY OF THE INVENTION

In consideration of the above-mentioned drawbacks in the prior art, an object of the present invention is to provide a data processing apparatus enabling a user to properly control the throughput of the communicating function and that of the data processing function.

Another object of the present invention is to provide a data processing apparatus enabling the user to select a desired proportion of the throughput, by effecting such selection in dialogue.

Still another object of the present invention is to provide a data processing apparatus enabling the user to select priority either for the data processing function or for the communicating function.

Still another object of the present invention is to provide a data processing apparatus enabling the user to recognize the proportion of the throughput of the data processing function and the communicating function.

Still other objects of the present invention, and the features thereof, will become fully apparent from the following description, which is to be taken in conjunction with the attached drawings.

BRIEF DESCRIPTION OF THE DRAWINGS

FIGS. 2 to 6 are flow charts showing the control sequences in the embodiment of the present invention;

FIG. 18 is a block diagram of a data processing apparatus constituting still another embodiment of the present invention; and FIG. 19 is a flow chart showing control sequence in the embodiment of the present invention.

DETAILED DESCRIPTION OF THE PREFERRED EMBODIMENTS

The present invention will now be clarified in detail with reference to an embodiment thereof, and the attached drawings.

Figure 1:
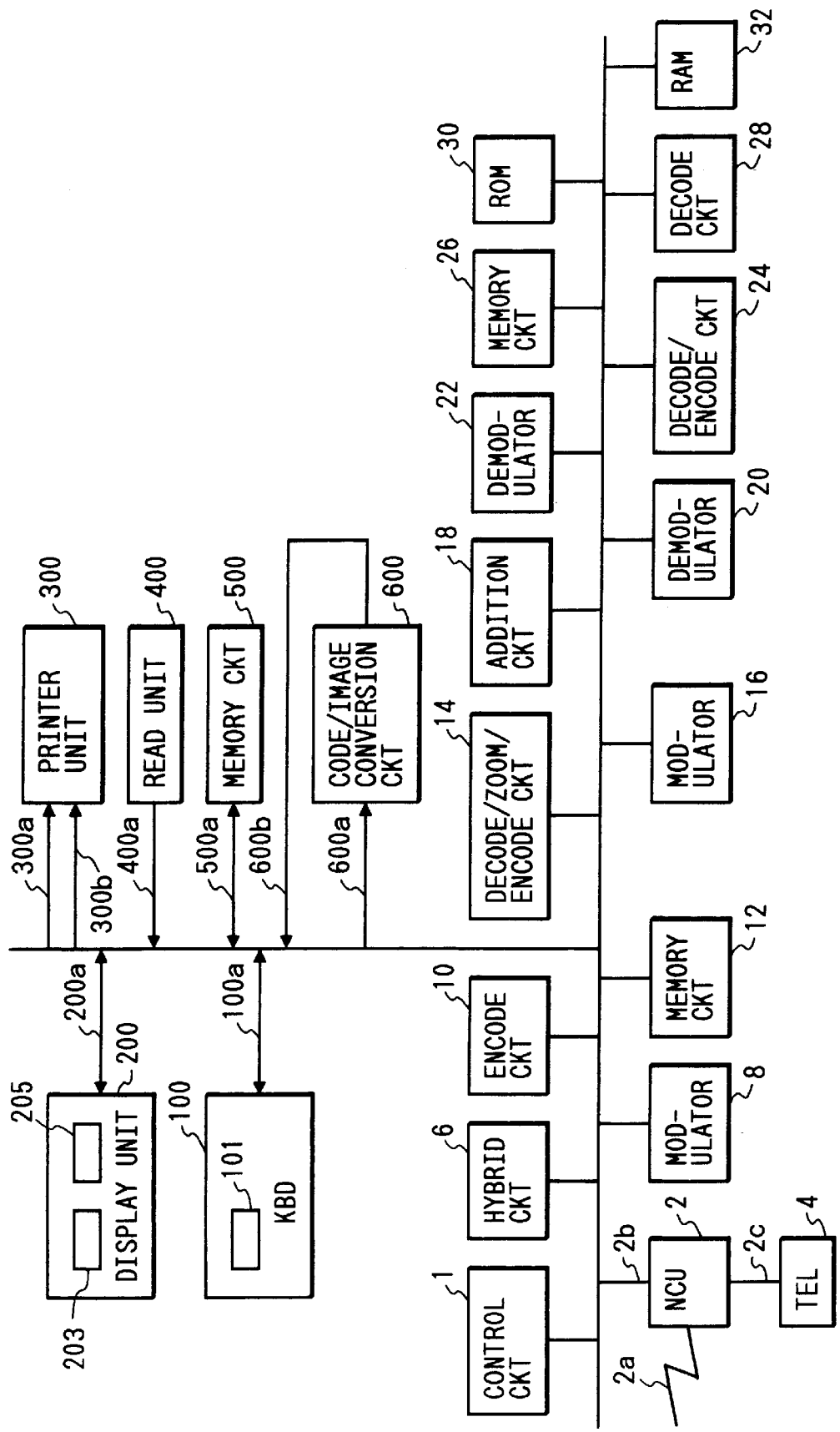
FIG. 1 is a block diagram of a data processing apparatus constituting an embodiment of the present invention.

FIG. 1 is a block diagram of a personal computer (PC) provided with a communicating function, constituting a data processing apparatus embodying the present invention.

Referring to FIG. 1, a keyboard 100 is provided with alphabetic keys, numeral keys, various operation keys and a switching button 101.

The switching button 101 is provided for switching the throughput of the data processing functions (hereinafter called PC functions) such as various calculations, and, in response to the depression of the switching button 101, a depression pulse provided to a signal line 100a.

A display unit 200 displays data processed by the PC functions, data handled in the communicating function, various messages and also effects display by display circuits 203 and 205.

The display circuit 203 is provided for displaying, on the display unit 200, a message representing the throughput of the PC function, and, for example cyclically displays one of the messages "rapid processing", "ordinary processing" and "slow processing" of the PC function, in response to each depression of the switching button 101.

A display circuit 205 is provided for displaying a message "CAN PC FUNCTION THROUGHPUT BE LOWERED?".

A printer unit 300 functions in the following manner. In case a signal of level "0" is provided on a signal line 300a, the signal on a signal line 300b is code information, and the printer unit 300 converts the code information into image information and effects recording of the image information. In case a signal of level "1" is provided on the signal line 300a, the signal on the signal line 300b is image information in the form of dot pattern, and the printer unit 300 records the image information.

A reader unit 400 reads original data and provides corresponding signals on a signal line 400a.

A memory circuit 500 effects data storage for example in the PC function, through a signal line 500a.

A code-image conversion circuit 600 converts code information, provided on a signal line 600a, into image information and releases the converted image information on a signal line 600b.

A control circuit 1 for controlling the entire apparatus controls the throughput, communicating process, data processing, display and other various units. The communication and data processing, if conducted simultaneously, are executed on a time-sharing basis. A lowering of the throughput of the communication process is achieved by a reduction in the transmission rate or by a flow control (continuous transmission of a flag sequence or transmission of a RNR signal). The control circuit 1, whenever lowering the throughput of the communicating function in the parallel functions on a time sharing basis, reduces the control time assigned to the communication process, in comparison with that assigned to the PC function, within a predetermined time. More specifically, in a normal state, the image data read in the reader unit 400 are processed in succession in an encoding circuit 10, the memory circuit 12 and a decode/zoom/encoding circuit 14 as is explained later. However, if the throughput of the communication process is lowered, the control time assigned to the communication process is shortened, so that the data are stored in a RAM 32 at each process, and the process is shifted to the PC function. For example, when the data of a predetermined amount are read in the reader unit 400, the data are stored in the RAM 32 and the process is shifted to the PC function. After the process in the PC function is conducted for a predetermined time, the process is again shifted to the communication function, wherein the data stored in the RAM 32 are transferred to and encoded in the encoding circuit 10, and are then again stored in the RAM 32. Depending on the selected throughput of the communicating function, there may be conducted plural processes (such as data reading by the reader unit 400 and the encoding by the encoding circuit 10) at a time, and, after the data are stored in the RAM 32, the process is shifted to the PC function.

The control circuit 1 selects the maximum transmission rate of the communicating function at 4800 b/s in case of "fast processing" throughput of the PC function, or 7200 b/s in case of "ordinary processing" throughput, or 9600 b/s in case of "slow processing" throughput.

A network control unit (NCU) 2 is connected to a telephone line in order to utilize the telephone network for data communication, and effects connection control of the telephone network, switching to the data communication channel and loop maintenance. The NCU 2 connects a telephone line 2a to a telephone unit 4 (2c) in case a signal of level "0" is provided by the control circuit 1, or connects the telephone line 2a to a facsimile unit 2b in case a signal of level "1" is provided. In the normal state, the telephone line 2a is connected to the telephone unit 4.

A hybrid circuit 6 separates a transmitted signal and a received signal, thus sending the transmission signal from an addition circuit 18 to the telephone line 2a through the NCU 2 and also sending the received signal through the NCU 2 to a demodulators 22 and 20.

A modulator 8, for modulation based on the recommendation V21 and the currently investigated recommendation V8 of ITU-T, modulates a protocol signal from the control circuit 1 for provision to the addition circuit 18.

An encoding circuit 10 effects, according to the control signal from the control circuit 1, encoding (MR encoding of k=8) of the data read by the reader unit 400 or the data converted into a dot pattern, and sends the encoded data to a memory circuit 12. In the MR encoding of k=8, eight scanning lines in a page are processed as a unit, in which the first scanning line is MH encoded while the remaining scanning lines are MR encoded.

The memory circuit 12 stores the encoded data from the encoding circuit 10 and sends thus stored data to the decode/zoom/encoding circuit 14, according to the control signal from the control circuit 1.

The decode/zoom/encoding circuit 14 effects, according to the control signal from the control circuit 1, reception of the MR encoded data from the memory circuit 12, then decoding, data zooming if necessary and again encoding for supply to a modulator 16.

The modulator 16 receives data from the decode/zoom/encoding circuit 14, and effects modulation according to the ITU-T recommendation V27 ter (differential phase modulation) or V29 (orhtogonal modulation), or the currently investigated recommendation v34, and sends thus modulated data to an addition circuit 18.

The addition circuit 18 adds the outputs of the modulators 8, 16, and sends the obtained output to the hybrid circuit 6.

A demodulator 20 effects demodulation based on the ITU-T recommendation V21 or the currently investigated recommendation V8. The demodulator 20 receives the protocol signal from the hybrid circuit 6, and effects the above-mentioned demodulation and sends the demodulated data to the control circuit 1.

A demodulator 22 effects demodulation based on the ITU-T recommendation V27 ter or V29, or the currently investigated recommendation V34. The demodulator 22 receives the modulated image signal from the hybrid circuit 6, and effects the above-mentioned demodulation and sends the demodulated data to a decode/encoding circuit 24.

According to the control signal from the control circuit 1, the decode/encoding circuit 24 receives the demodulated data from the demodulator 22, then effects decoding (MH or MR decoding) and releases the decoded data. It also effects MR encoding of k=8 on said decoded data and outputs thus encoded data.

A memory circuit 26 effects, according to the control signal from the control circuit 1, storage of the MR encoded data from the decode/encoding circuit 24, and provision of the stored data to a decoding circuit 28.

The decoding circuit 28 effects, according to the control signal from the control circuit 1, decoding (MR decoding of k=8) on the data supplied from the memory circuit 26 and outputs the decoded data.

A read-only memory (ROM) 30 stores the programs to be executed by the control circuit 1.

A RAM 32, capable of data reading and writing, is used as a work area.

The above-described units are mutually connected by a bus, through which the data are transferred.

Figure 2:
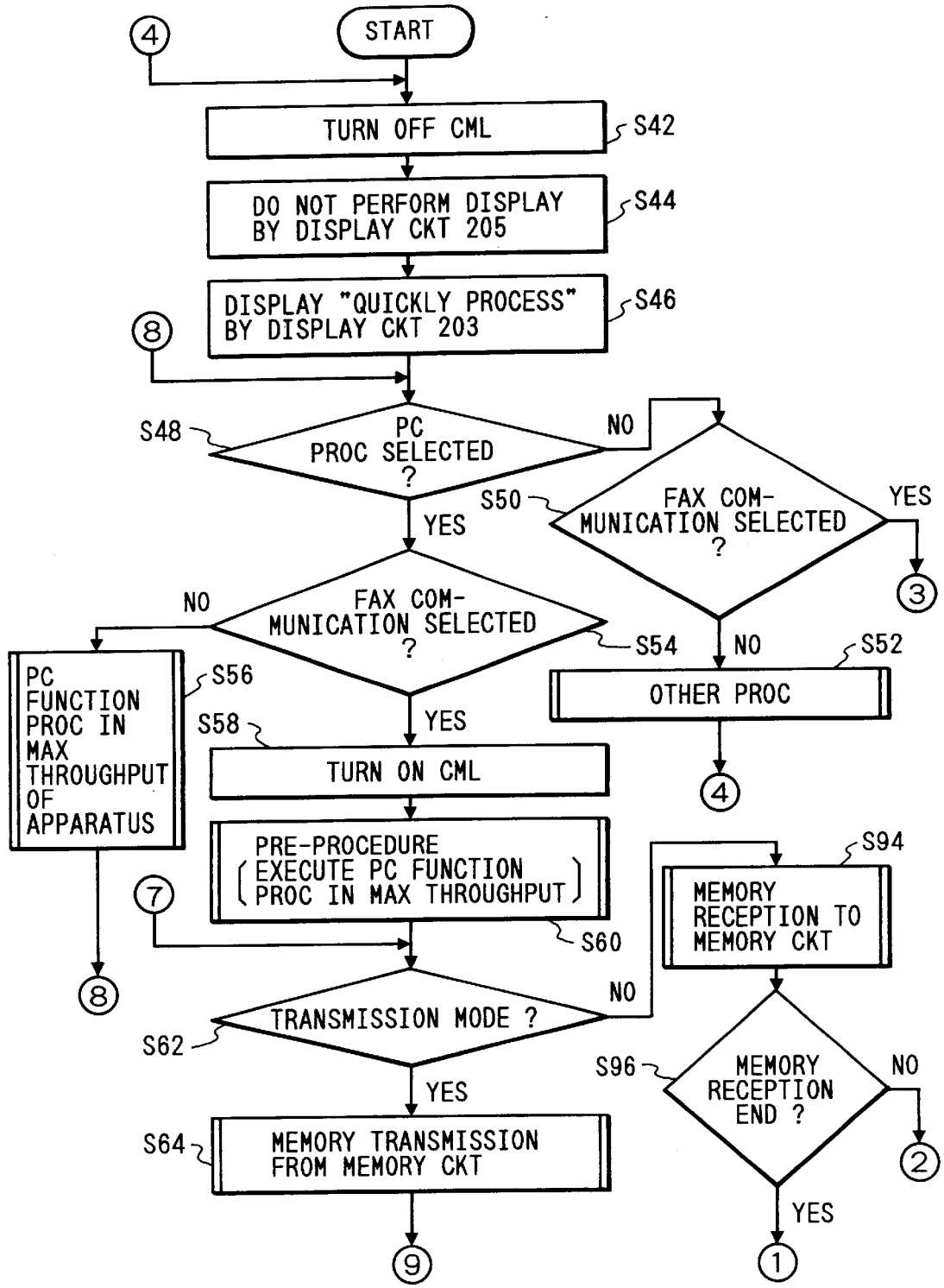
Figure 3B:
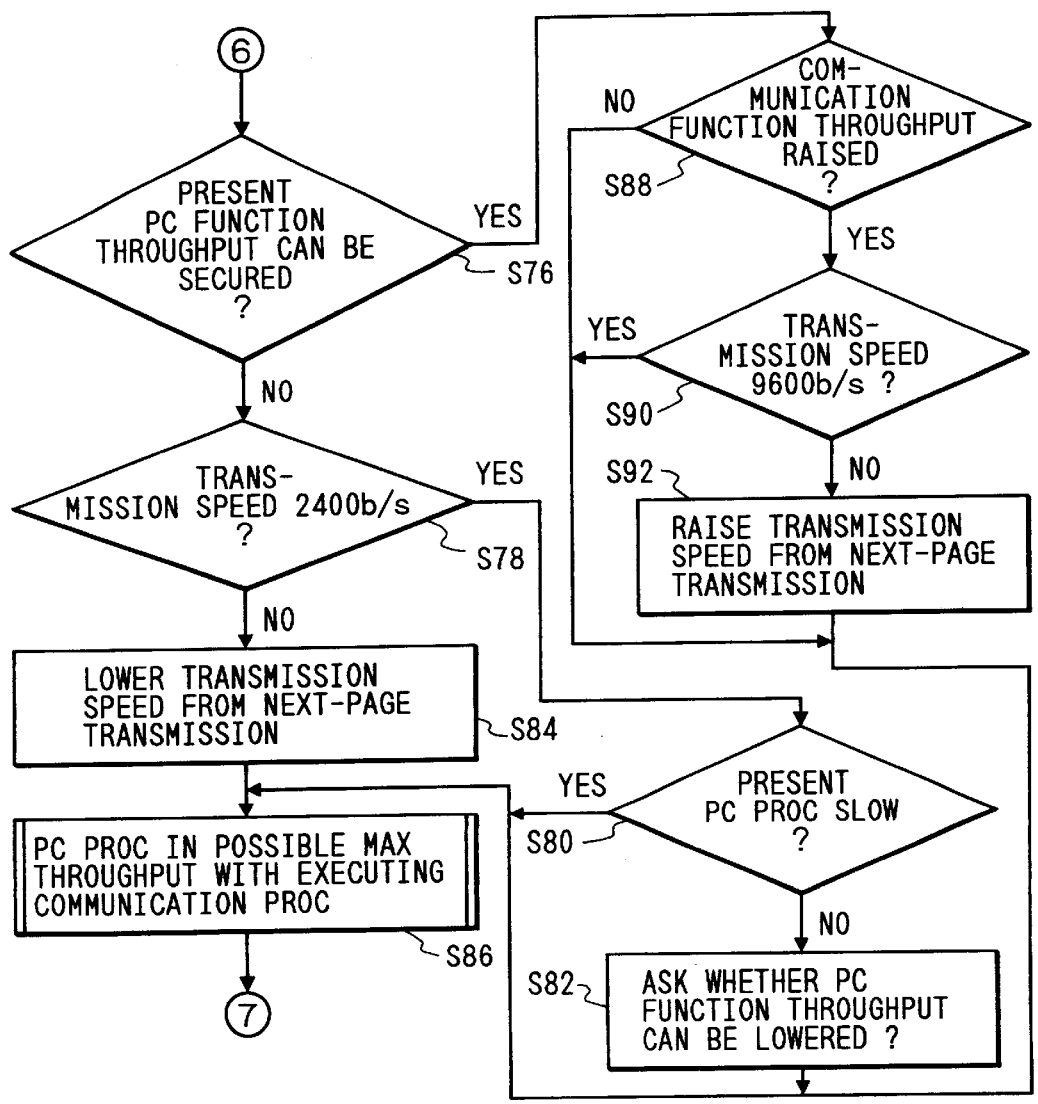

FIGS. 2 to 4 are flow charts showing the control sequences of the control circuit 1 of the present embodiment.

At first a step S42 sends a signal of level "0" to the NCU 2, thereby turning off the CML. A step S44 selects not to display, by the display circuit 205, a message whether the throughput of the PC function can be lowered. A step S46 causes the display circuit 203 to display "quick processing".

Then a step S48 discriminates whether the processing with the PC function has been selected, and, if selected, the sequence proceeds to a step S54, but, if not, the sequence proceeds to a step S50.

The step S50 discriminates whether facsimile communication, namely processing with the communicating function has been selected, and, if selected, the sequence proceeds to a step S98, but, if not, the sequence proceeds to a step S52, for another processing.

Also a step S54 discriminates whether facsimile communication has been selected, and, if selected, the sequence proceeds to a step S58, but, if not, the sequence proceeds to a step S56.

The step S56 effects the processing of the PC function with the maximum throughput available in the apparatus, regardless of the display of the throughput of the PC function shown by the display circuit 203.

A step S58 sends a signal of level "1" to the NCU 2 to turn on the CML, and a step S60 executes the pre-protocol for the facsimile communication. At the same time, there is conducted the processing of the PC function with the maximum throughput available in the apparatus. However the throughput of the PC function may be arbitrarily switched by the switching button 101.

A step S62 discriminates whether the processing by the communicating function is in the transmission mode, and, if in the transmission mode, the sequence proceeds to a step S64, but, if in the reception mode, the sequence proceeds to a step S94.

The step S64 executes memory transmission of the data stored in the memory circuit 12. A next step S68 discriminates whether the memory transmission has been completed, and, if completed, the sequence proceeds to a step S70, but, if not, the sequence proceeds to a step S74.

The step S70 executes the post-protocol for the facsimile transmission. Also there is executed the processing in the PC function, with the maximum throughput available in the apparatus. However, there also may be employed a throughput arbitrarily desired by the user. Then a step S72 sends a signal of level "0" to the NCU 2, thereby turning off the CML.

The step S74 discriminates whether a PC process has been selected, namely whether the process by the PC function is in progress, and, if selected, the sequence proceeds to a step S76, but, if not, the sequence proceeds to a step S102.

The step S76 discriminates whether the current throughput of the PC function, displayed by the display circuit 203, is secured, and, if secured, the sequence proceeds to a step S88, but, if not, the sequence proceeds to a step S78.

The step S78 discriminates whether the current transfer rate of the process of the communicating function is the lowest transfer rate capable of image transmission. As the image transfer is considered at 2400, 4800, 7200 or 9600 b/s, the above-mentioned step discriminates whether the image transfer rate is 2400 b/s, and, if affirmative, the sequence proceeds to a step S80, but, if negative, the sequence proceeds to a step S84.

The step S80 receives the information of the display circuit 203 and discriminates whether "slow processing" is selected for the current processing of the PC function, and, if selected, the sequence proceeds to a step S86, but, if not, the sequence proceeds to a step S82.

The step S82 causes the display circuit 205 to display a question whether the throughput of the PC function can be lowered. The display by the display circuit 205 is erased if the user selects to lower the throughput of the PC function, by means of the throughput switching button 101.

The step S84 lowers, starting from the next page, the throughput to a level where the current throughput of the PC function can be secured.

If the current throughput of the PC function cannot be secured even when the transfer rate of the communicating function is lowered to the minimum level of 2400 b/s, the sequence returns to the step S78. On the other hand, if the current throughput of the PC function can be secured, the sequence proceeds to a step S86.

The step S86 executes the processing of the PC function with the maximum available throughput, while conducting the process of the communicating function.

A step S88 discriminates whether the throughput of the communicating function can be raised, and, if throughput can be raised, the sequence proceeds to a step S90, but, if not, the sequence proceeds to the step S86.

The step S90 discriminates whether the current transmission speed of the process of the communicating function is the highest transmission speed enabling image transmission. As the image transmission is considered at 2400, 4800, 7200 or 9600 b/s, there is discriminated whether the image transmission is at 9600 b/s, and, if so, the sequence proceeds to the step S86, but, if not, the sequence proceeds to a step S92. The step S92 raises the transmission speed, starting from the next page, to a level where the current throughput of the PC function can be secured.

A step S94 executes memory reception to a memory circuit 26, then a step S96 discriminates whether the memory reception has been completed, and, if completed, the sequence proceeds to the step S70, but, if not, the sequence proceeds to the step S74.

A step S98 sends a signal of level "1" to the NCU 2, thereby turning on the MCL. Then a step S100 executes a pre-procedure for the facsimile communication, then a step S102 discriminates whether the process of the communicating function is in the transmission mode, and, if in the transmission mode, the sequence proceeds to a step S104, but, if in the reception mode, the sequence proceeds to a step S114.

The step S104 executes memory transmission from the memory circuit 12, then a step S106 discriminates whether the memory transmission has been completed, and, if completed or not, the sequence respectively proceeds to a step S108 or S112.

The step S108 executes a post-procedure of the facsimile communication. A next step S110 sends a signal of level "0" to the NCU 2, thereby turning off the CML, and the sequence then returns to the step S42.

The step S112 discriminates whether a process by the PC function has been selected, and, if selected, the sequence proceeds to the step S76, but, if not, the sequence proceeds to the step S106.

The step S114 executes memory reception to the memory circuit 26. A next step S116 discriminates whether the memory reception has been completed, and, if completed, the sequence proceeds to the step S108, but, if not, the sequence proceeds to a step S118.

The step S118 discriminates whether a process by the PC function has been selected, and, if selected, the sequence proceeds to the step S76, but, if not, the sequence proceeds to the step S116.

In the foregoing first embodiment, the lowering in the throughput of the communicating function is achieved by a reduction in the transmission speed of the memory transmission or memory reception, but, as a second embodiment, there may also be utilized a reduction in the throughput of the communicating function by a flow control. More specifically, flags are transmitted between the frames at the transmission, and RNR signal is transmitted at the reception.

Figure 5:
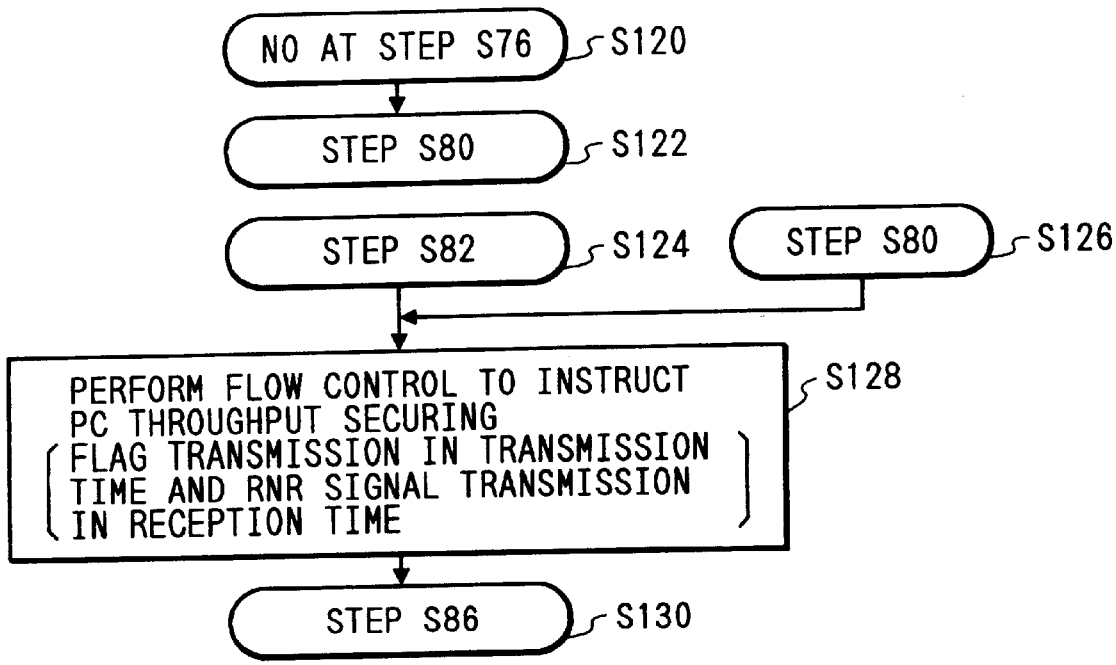

FIG. 5 is a flow chart of the control sequence in the second embodiment, showing only a part which is different from the first embodiment.

A step S120 corresponds to the NO branch of the above-described step S76, and, from a next step S122, the sequence proceeds to the above-described step S80.

Also a step S124 corresponds to the above-described step S82, and a step S126 corresponds to the above-described step S84.

A next step S128 executes flow control, and instructs to secure the throughput of the PC function. The flow control is executed, in the transmission, by the flag transmission, and, in the reception, by the RNR signal transmission.

From a next step S130, the sequence proceeds to the above-explained step S86.

Also as a third embodiment of the present invention, in the simultaneous execution of a process by the PC function and a process by the communicating function, if the current throughput of the PC function becomes difficult to secure, the display circuit 205 displays a question whether the throughput of the PC function can be lowered, and, in response to an instruction of the user to lower the throughput of the PC function, the throughput of the PC function may be lowered while the throughput of the communicating function is retained. As long as the current throughput of the PC function is secured, the process is continued regardless of the throughput of the communicating function.

Figure 6:
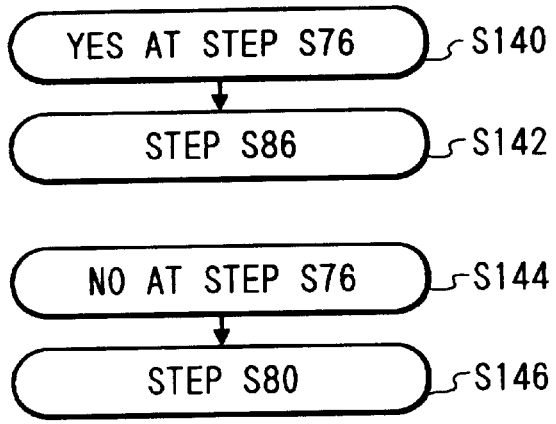

FIG. 6 is a flow chart of the control sequence of the third embodiment, showing only a part which is different from the first embodiment.

At first a step S140 corresponds to the YES branch of the above-described step S76, and, in a next step S142, the sequence proceeds to the above-described step S86. Also a step S144 corresponds to the NO branch of the above-described step S76, and, in a next step S146, the sequence proceeds to the above-described step S80.

In the foregoing embodiments, if there is selected a collective process of the PC function, such as writing, reading or collective search of the memory circuit 502, such process may be executed in the course of processing or during flow control.

Also in the third embodiment shown in FIG. 6, the throughput of the communicating function may be lowered in case the instruction of the user to lower the throughput of the PC function is not given within a predetermined time.

According to the first, second or third embodiment described above, if the current throughput of the PC function becomes difficult to secure, it is rendered possible to retain the throughput of the PC function by lowering the throughput of the communicating function. Also in case the current throughput of the PC function cannot be secured even by a lowering in the throughput of the communicating function, there is asked a question whether the throughput of the PC function can be lowered, and, the communication process can be continued by the instruction of the user to lower the throughput of the PC function.

It is furthermore possible to select the throughputs of the PC function and the communicating function, according to the current status.

In the following there is described a fourth embodiment of the present invention.

Figure 7:
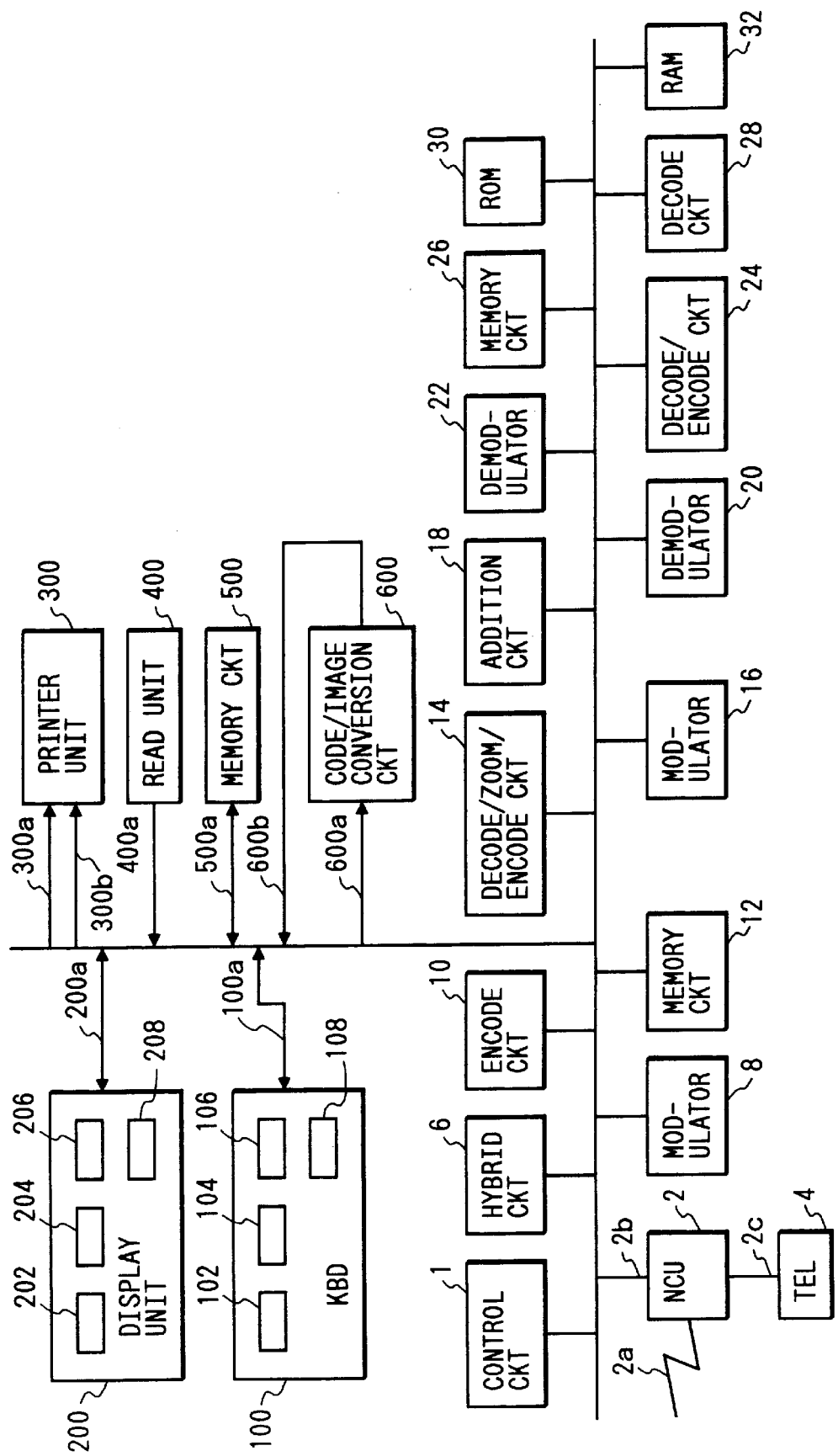
FIG. 7 is a block diagram of a data processing apparatus constituting another embodiment of the present invention.
Figure 8:
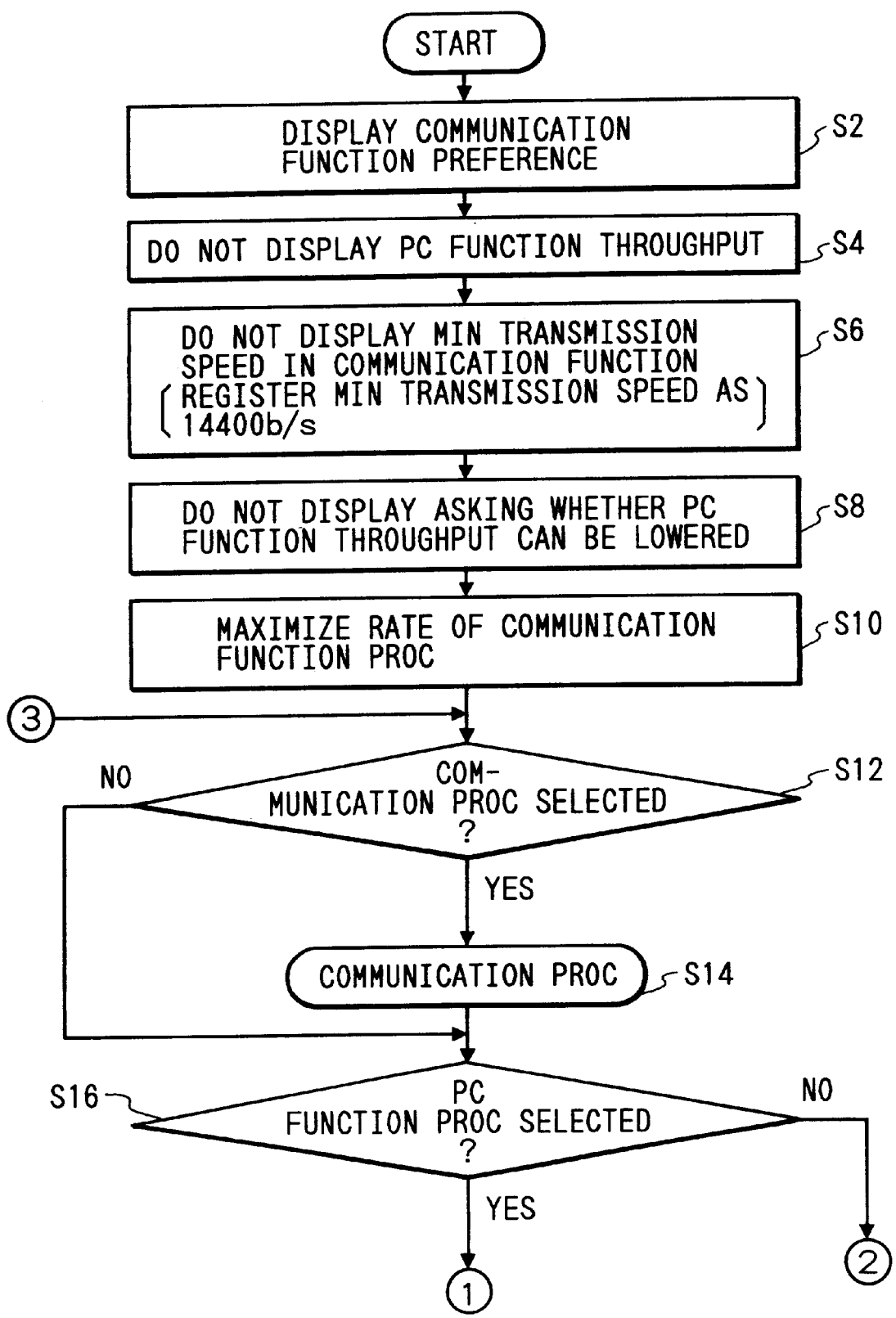
FIGS. 8 to 17 are flow charts showing control sequences in the embodiment of the present invention.
Figure 9:
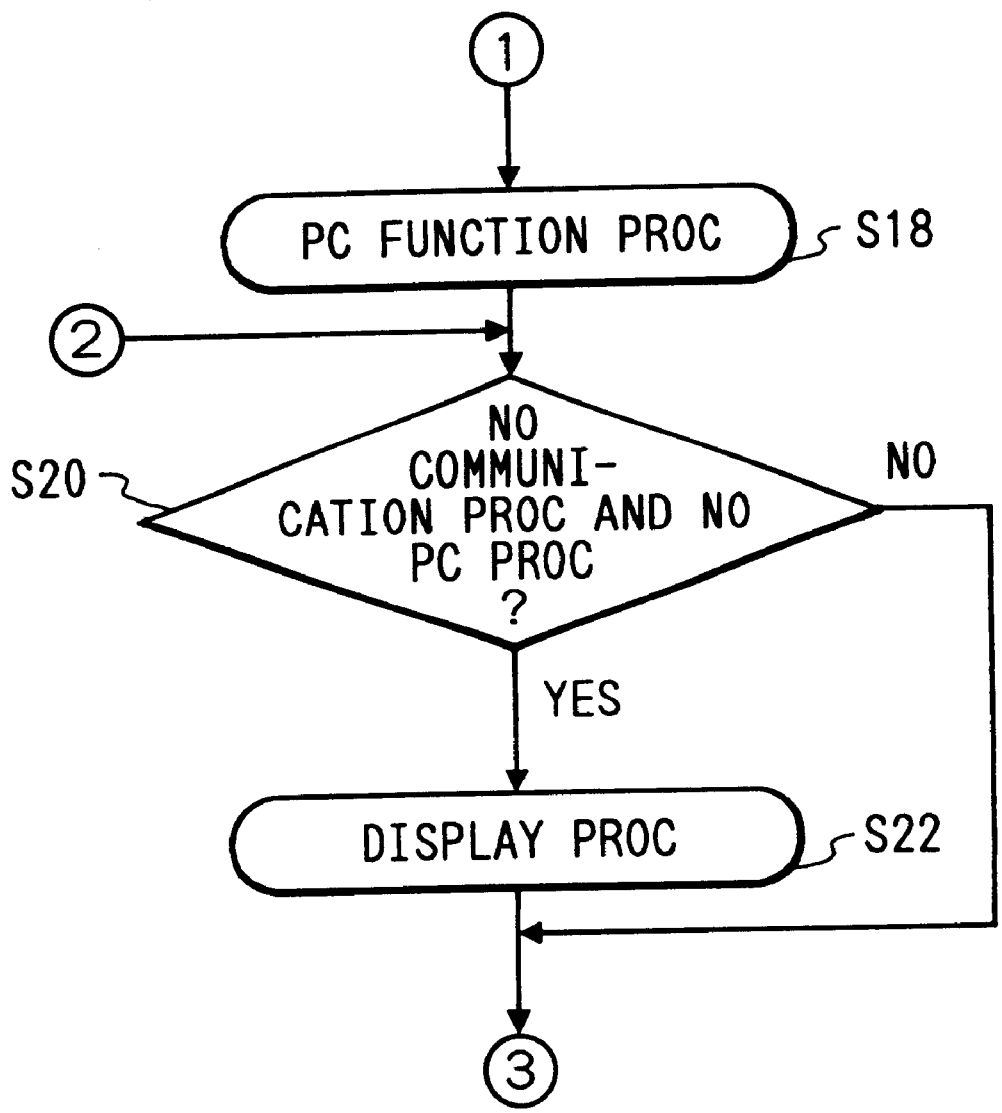

FIG. 7 is a block diagram of a personal computer with a communicating function, constituting a data processing apparatus embodying the present invention.

Referring to FIG. 7, a keyboard 100 is provided with alphabet keys etc. and operation keys 102, 104, 106 and 108.

A communication/PC preference selection button 102 switches the preference of the communicating function and the PC function at every depression.

A button 104, for switching the throughput of the PC function, cyclically switches the throughput of the PC function to "very quick", "quick" or "less quick" at each depression, when the preference is given to the PC function.

An operation unit 106 is provided for registering the minimum transmission speed in the communicating function. For example, in the present embodiment, there can be employed transmission speeds of 28,800, 26,400, 24,000, 21,600, 19,200, 16,800, 14,400, 12,000, 9,600, 7,200, 4,800 and 2,400 b/s, and there is registered the minimum permissible transmission speed of the communicating function when the preference is given to the PC function. This operation unit 106 at first displays the above-mentioned available transmission speeds on a display unit 200, and the minimum permissible transmission speed is determined by a cursor key and a set key.

A button 108 is used for permitting to lower the throughput of the PC function, in response to a display on the display unit 200 whether the throughput of the PC function can be lowered, and, at each depression, the throughput of the PC function is lowered. For all the processes, the proportion of the process of the PC function is lowered by 10% at each depression of the button 108.

A display unit 200 displays data processed by the PC function, those processed by the communicating function and various messages, and also effects displays by display circuits 202, 204, 206 and 208.

A communication/PC preference selection display circuit 202 alternately displays a message "preference on communication" or "preference on PC function" at each depression of the button 102.

A display circuit 204 for displaying the throughput of the PC function switches the displays of the proportion of the process of the PC function, "very quick (80%)", "quick (70%)" and "less quick (60%)" in cyclic manner, at each depression of the switching button 104, taking the proportion of the process as 100% when the communication is not conducted. No display is provided when the preference is given by the button 102 to the communicating function, and, when the preference is given to the PC function, there is displayed the proportion of the process of the PC function, displayed when the preference was previously given to the PC function. On the other hand, when the process of the PC function is conducted simultaneous with the process of the communicating function, with the preference given to the PC function for the first time, there is, for example, given a display "less rapid (60%)", and the display is switched by each subsequent depression of the switching button 104. Also in response to each depression of the button 108, the display is cyclically switched in the sequence of "very quick (80%)", "quick (70%)", "less quick (60%)", "ordinary (50%)", "slightly slow (40%)", "slow (30%)" and "very slow (20%)". This display is given in a part of the display unit 200, and is erased after the completion of the process by the communicating function or by the PC function.

A display circuit 206, for displaying the minimum transmission speed in the communicating function, displays the minimum transmission speed registered by the operation unit 106. At the registration by the operation unit 106, the display circuit 206 provides the display of all the available transmission speeds, and the minimum transmission speed is selected by a cursor moved by a cursor key and set by a set key. This display circuit 206 does not provide any display when the preference is given to the communicating function by the button 102, but, when the preference is given to the PC function, displays the minimum transmission speed of the communicating function, displayed when the preference was previously given to the PC function. On the other hand, when the preference is given to the PC function for the first time, there is, for example, given a display of 14,400 b/s, which can be subsequently switched by the operation unit 106.

A display circuit 208 displays a question whether the throughput of the PC function can be lowered, in case a process by the PC function and a process by the communicating function are executed simultaneously with the preference given to the PC function and in case the current throughput of the PC function cannot be secured even if the transmission speed of the communication is lowered to the minimum transfer rate registered by the operation unit 106. After this display is provided, the throughput of the PC function can be lowered by the depression of the button 108.

The control circuit 1 effects control in such a manner as to set the maximum available transmission speed of the communicating function at 14,400 b/s in case of "very quick (80%)" throughput of the PC function, 16,800 b/s for "quick (70%)", 19,200 b/s for "less quick (60%)", 21,600 b/s for "ordinary (50%)", 24,000 b/s for "slightly slow (40%)", 26,400 b/s for "slow (30%)" and 28,800 b/s for "very slow (20%)".

Other components are not described as they are the same as those of the corresponding numbers in FIG. 1.

FIGS. 8 to 17 are flow charts showing the control sequences of the control circuit 1.

At first a step S2 selects the preference on the communicating function as the initial setting, and causes the display circuit 202 to display the preference on the communicating function, on the display unit 200.

A next step S4 displays the current throughput of the PC function on the display unit 200.

A step S6 causes the display circuit 206 to display the minimum transmission speed of the communicating function, on the display unit 200. A rate of 14,400 b/s is registered as the initial setting for the minimum transmission speed.

A step S8 does not cause the display circuit 208 to display the question whether the throughput of the PC function can be lowered.

A step S10 maximizes the proportion of the process by the communicating function, as the preference is currently given to the communicating function.

Then a step S12 discriminates whether a process by the communicating function has been selected, and, if selected, the sequence proceeds to a step S14 for effecting the communication process, but, if not, the sequence proceeds to a step S16. In this state the preference can be switched by the button 102.

A step S16 discriminates whether a process by the PC function has been selected, and, if selected, the sequence proceeds to a step S18 for effecting a PC process, but, if not, the sequence proceeds to a step S20.

A step S20 discriminates whether both the processes by the PC function and by the communication are not conducted, and, if both are not conducted, the sequence proceeds to a step S22 to effect the display process for a predetermined time, but, if either is conducted, the sequence proceeds to a step S12.

In the following a description is provided of the process by the communicating function.

Figure 10:
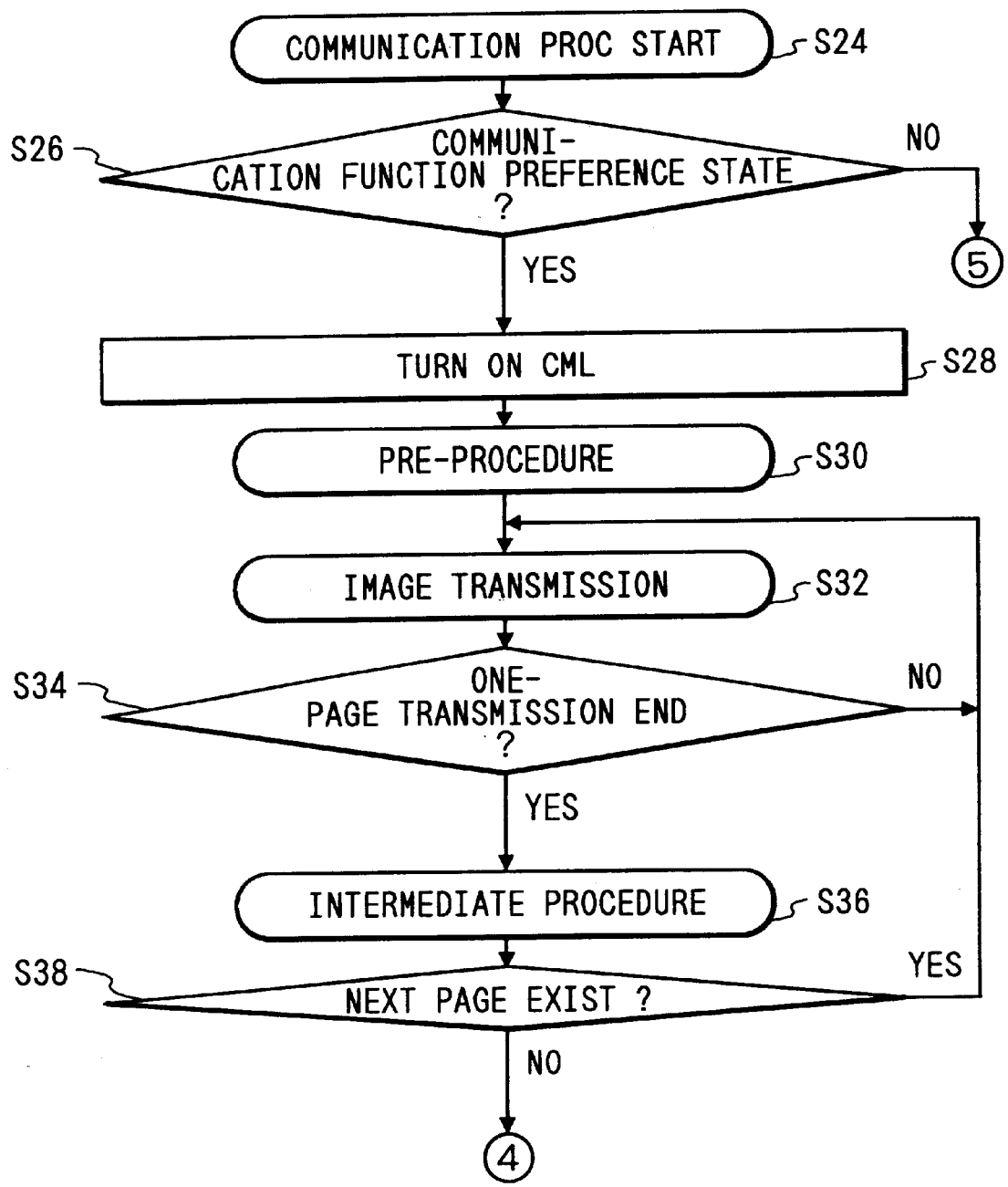
Figure 11:
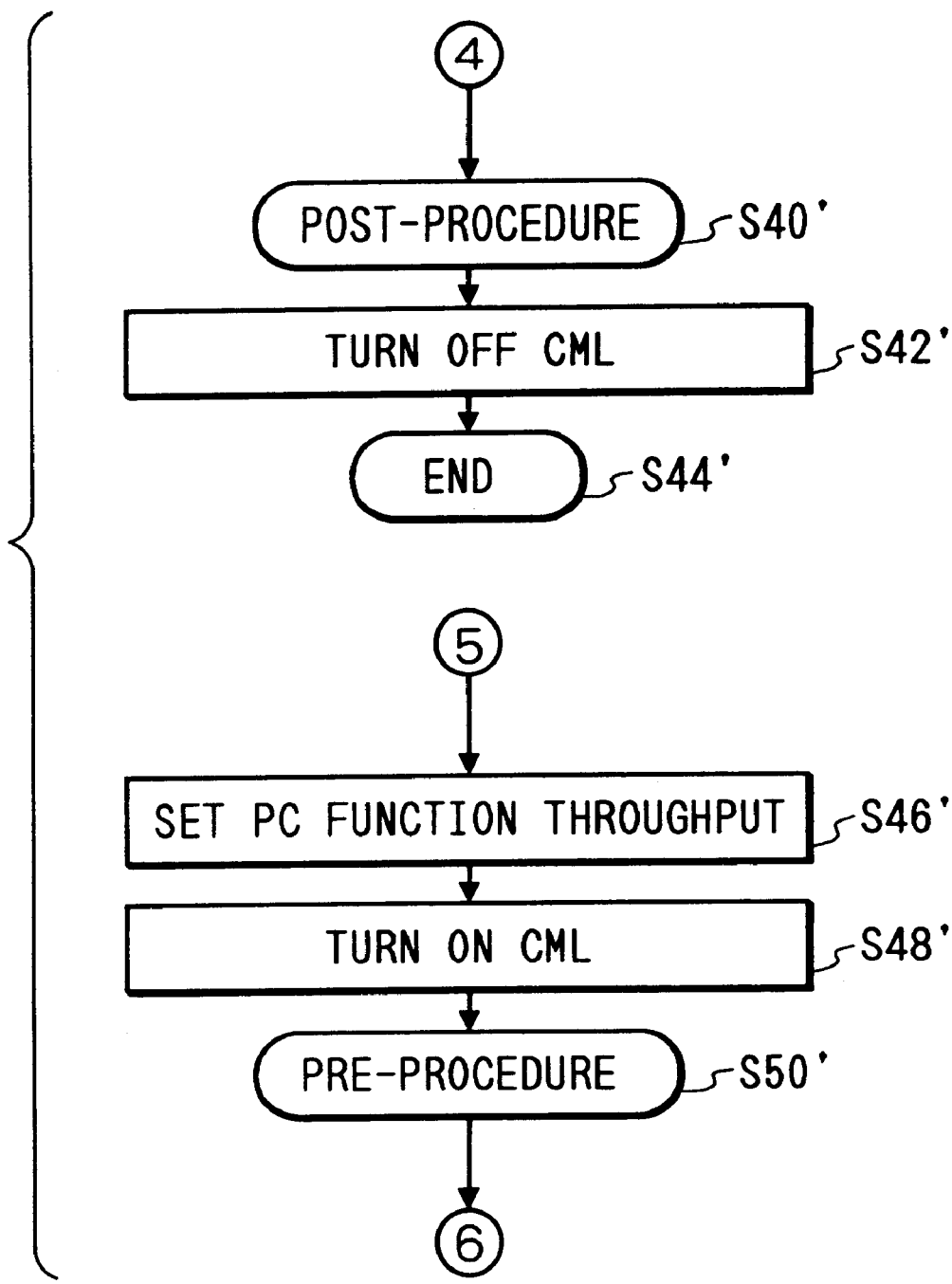
Figure 12:
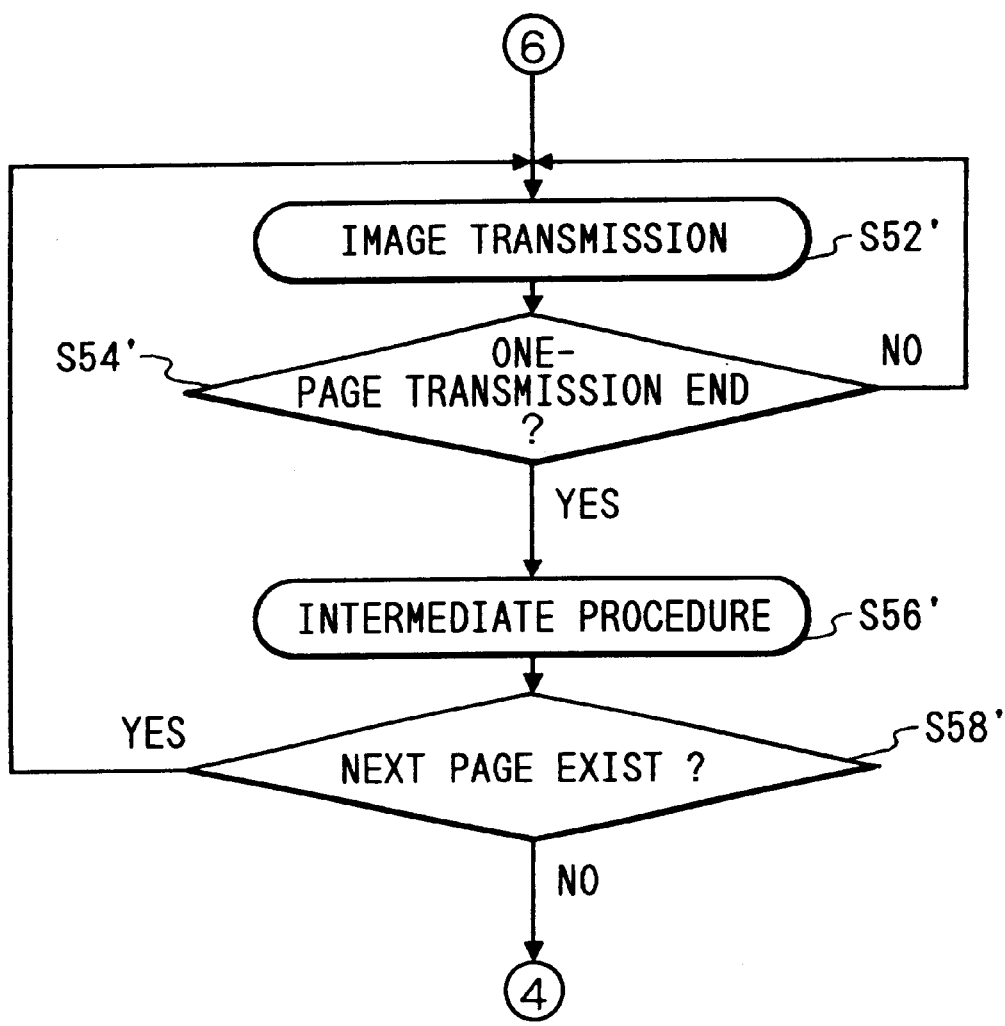

FIGS. 10 to 12 are flow charts showing the control sequences in the communicating function.

During a process by the communicating function, there is constantly checked whether a process by the PC function is executed, and, if not executed, the communication is executed with the maximum transfer rate, but, if executed, the communication is executed with the maximum transfer rate available at that point.

A step S26 checks the function to which the preference is currently given, and, if the preference is given to the communicating function, the sequence proceeds to a step S28, but, if not, the sequence proceeds to a step S46.

A step S28 connects the telephone line 2a to the facsimile side (2b), and turns on the CML.

A step S30 executes pre-procedure in the facsimile communication. As the preference is given to the communicating function in this state, the communicating ability of the destination state and the line status are judged in the pre-procedure for maximizing the proportion of the process of the communicating function, and the communication is to be conducted with the maximum practiceable transfer rate.

A next step S32 initiates the image transmission, with the transfer rate determined in the pre-procedure (S30) or in an intermediate procedure (S36).

A next step S34 discriminates whether the image transmission of a page has been completed, and, if completed, the sequence proceeds to a step S36, but, if not, the sequence proceeds to a step S32.

A step S36 executes an intermediate procedure for the facsimile communication. Since the preference is given to the communication in this state, the communication is to be conducted with the maximum practiceable transmission speed.

Then a step S38 discriminates whether image data of a next page to be transmitted exists, and, if the next page exists, the sequence proceeds to a step S32, but, if not, the sequence proceeds to a step S40.

A step S40' executes the post-procedure of the facsimile transmission.

Then a step S42' connects the telephone line (2a) to the telephone unit side 4 (2c), and turns off the CML.

A step S44' terminates the process of the facsimile communication.

A step S46', corresponding to a state in which the preference is given to the PC function, causes the display circuit 204 to display the current throughput of the PC function, thus enabling to switch the throughput by the switching button 104. For example, if the current throughput of the PC function is 80%, the process is executed with a speed of about 80% of the maximum speed.

A next step S48' connects the telephone line (2a) to the facsimile side (2b), and turns on the CML.

A step S50' executes the pre-procedure of the facsimile communication. In this step, the communicating ability of the destination station and the line status are judged, and the communication is to be conducted with the maximum practiceable transmission speed. Also there is secured a transmission speed at least equal to the minimum transmission speed displayed by the display circuit 206. Also in case the minimum transfer rate cannot be secured, a message of this fact is displayed on the display unit 200.

A next step S52' initiates the image transmission, with a transmission speed determined in the pre-procedure (S50') or in an intermediate procedure (S56').

A step S54' then discriminates whether the image transmission of a page has been completed, and, if completed, the sequence proceeds to a step S56', but, if not, the sequence proceeds to the step S52'.

A step S56' executes an intermediate procedure for the facsimile transmission. Also in this state, the communication is to be conducted with the maximum practiceable transmission speed. Also there is secured a transmission speed at least equal to the minimum transmission speed displayed by the display circuit 200. If the minimum transfer rate cannot be secured, a message of this fact is displayed on the display unit 200.

A next step S58' discriminates whether image data of a next page to be transmitted exists, and, if the next page exists, the sequence proceeds to the step S52', but, if not, the sequence proceeds to the step S40'.

In the following there is described the process by the PC function.

Figure 13:
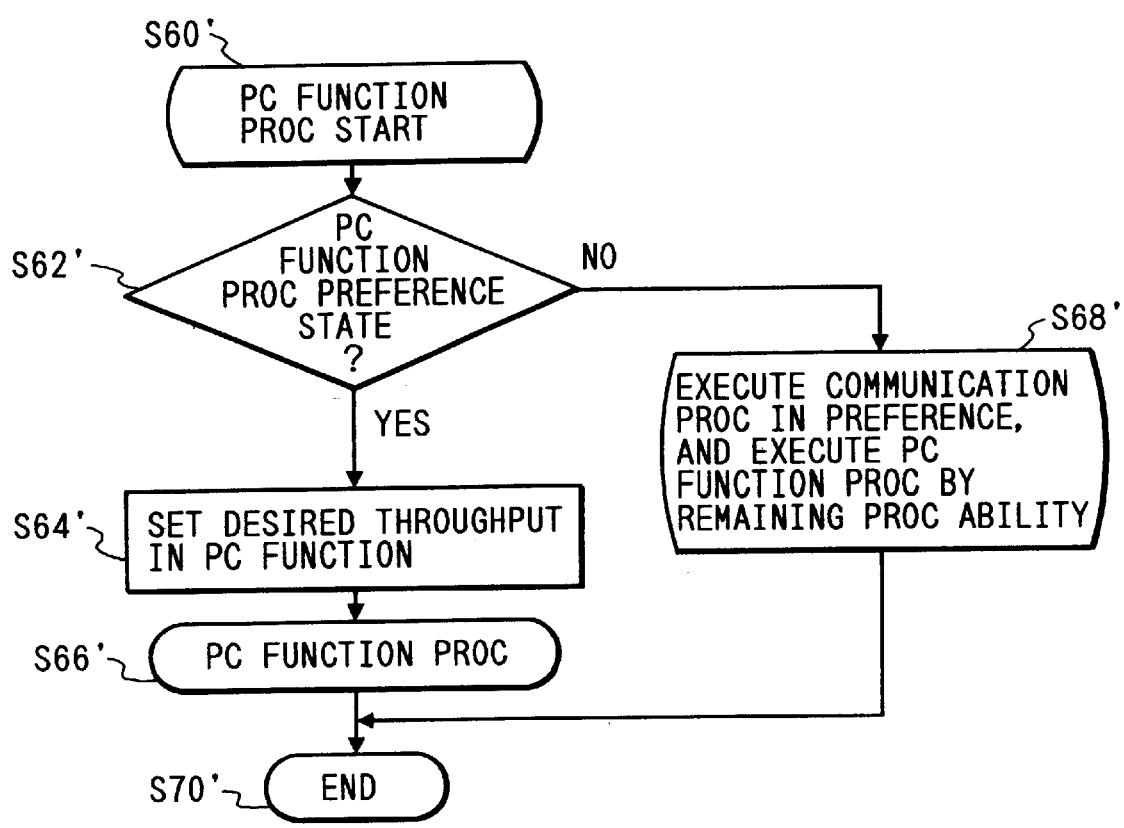

FIG. 13 shows the control process of the PC function. In this flow chart there is described a process by the PC function during the execution of a process by the communicating function.

A step S60' initiates the process by the PC function.

A next step S62' checks the function to which the preference is currently given, and, if the preference is given to the process by the PC function, the sequence proceeds to a step S64', but, if the preference is given to the communication, the sequence proceeds to a step S68'.

A step S64', corresponding to a situation where the preference is given to the PC function, causes the display circuit 204 to display the current throughput of the PC function and enables setting of a desired throughput by the depression of the switching button 104.

A step S66' executes the process by the PC function, with the throughput set in the step S64'.

A step S68' selects to give preference to the process of the communicating function and to execute the process of the PC function within the remaining capacity.

A step S70' terminates the sequence.

Figure 14:
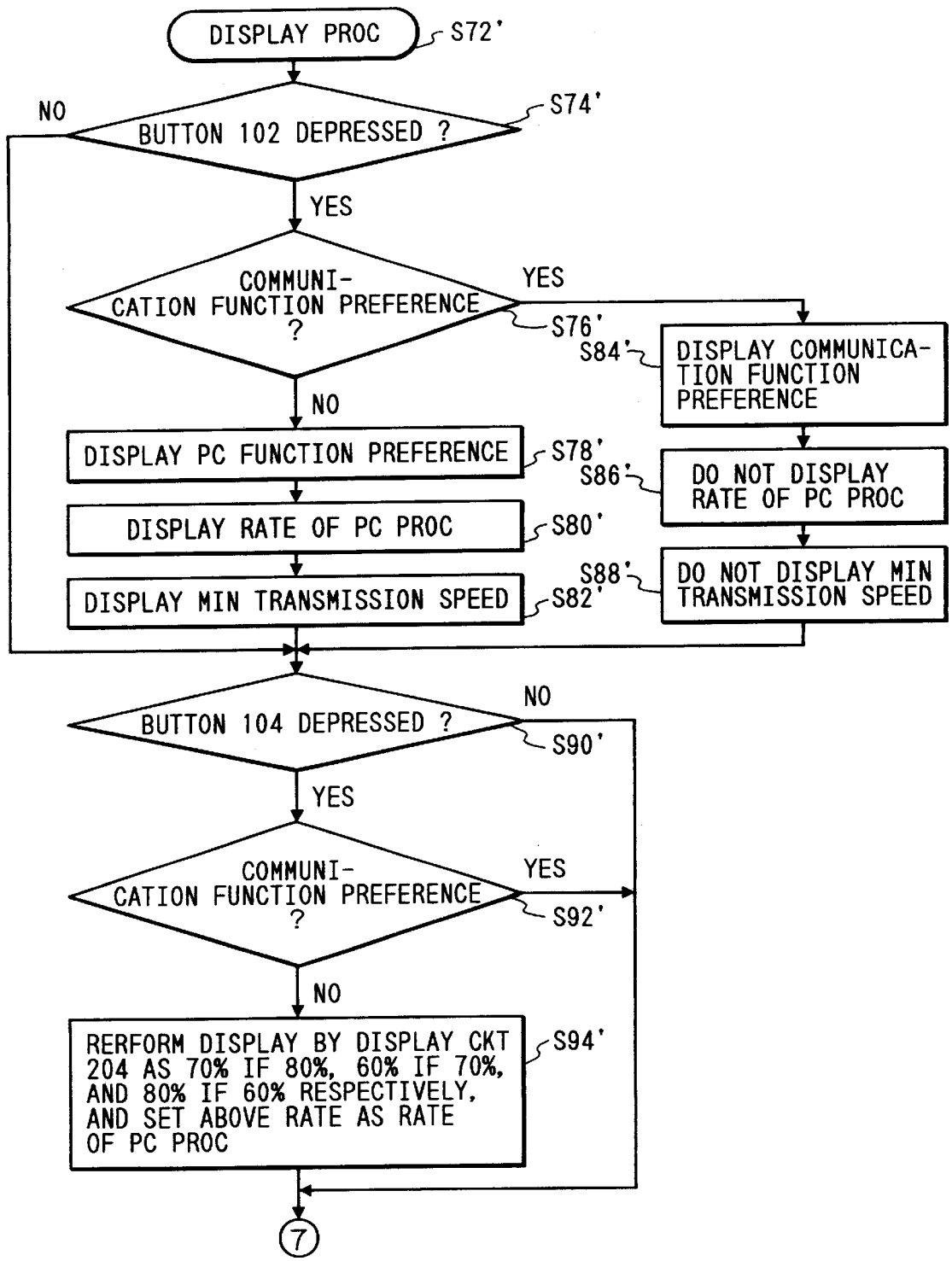
Figure 15:
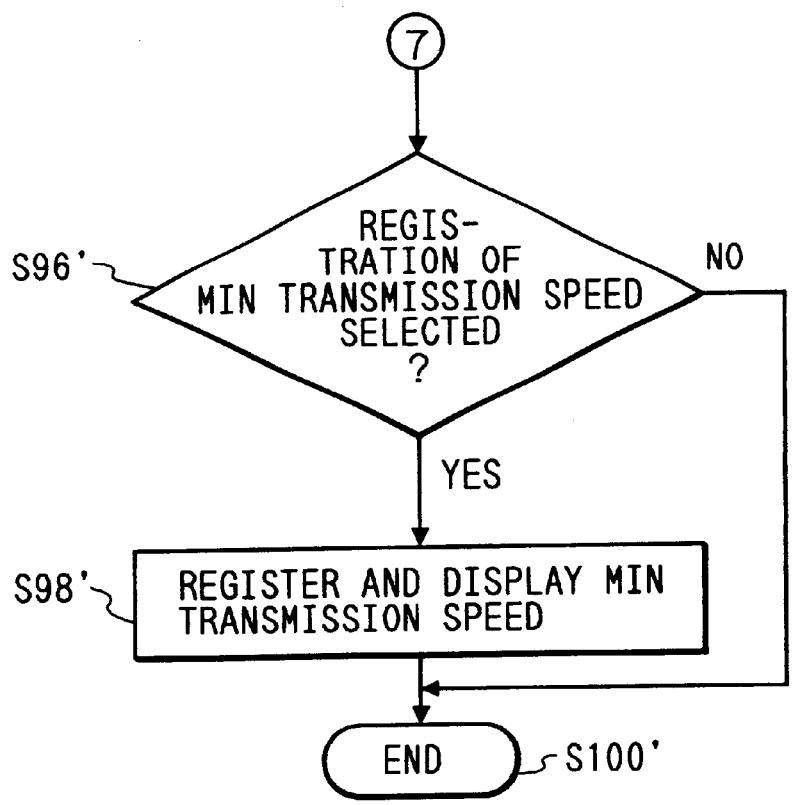

In the following there is described the display process, with reference to FIGS. 14 and 15 showing the control sequence.

A step S74' discriminates whether the button 102, for selecting the communication/PC preference, has been depressed, and the sequence proceeds to a step S76' or S90' respectively if the button 102 has been depressed or not.

A step S76' discriminates whether the preference is given to the communicating function, and the sequence proceeds to a step S84' or S78' respectively if the preference is given to the communicating function or to the PC function.

A step S78' causes the display circuit 202 to display a message "preference on PC function" on the display unit 200.

A step S80' causes the display circuit 204 to display the current proportion of the process of the PC function on the display unit 200.

A step S82' causes the display circuit 206 to display the registered minimum transmission speed in the communicating function, on the display unit 200.

A step S84' causes the display circuit 202 to display a message "preference on communication" on the display unit 200.

A step S86' causes the display circuit 204 not to display the throughput of the PC function.

A step S88' causes the display circuit 206 not to display the minimum transmission speed of the communicating function.

A step S90' discriminates whether the switching button 104, for switching the throughput of the PC function, has been depressed, and, if depressed, the sequence proceeds to a step S92' to check the currently preferred function. If the preference is given to the PC function, a step S94' causes the display circuit 204 to switch the display of the throughput of the PC function.

On the other hand, if the step S90' identifies that the switching button 104 has not been depressed, or, if the switching button 104 has been depressed but the step S92' has given preference to the communicating function, the sequence proceeds to a step S96'.

The step S96' discriminates whether the operation unit 106 has selected the registration of the minimum transmission speed of the communicating function, and, if selected, the sequence proceeds to a step S98' to register the minimum transmission speed and to display the speed by the display circuit 206. On the other hand, if the registration has not been selected, a step S100' terminates the sequence.

As explained in the foregoing, the fourth embodiment enables the user to give preference to the PC function or to the communicating function, according to the situation. Also, since the currently preferred function is displayed, the user can recognize the function for which the preference is currently given and can vary the preference when necessary.

Also in the communicating function, it is rendered possible to secure the minimum transmission speed by registering the minimum level to which the transmission speed can be lowered.

In the following there is described a fifth embodiment of the present invention.

In said fifth embodiment, in case the minimum transmission speed of the communicating function, registered in the fourth embodiment, cannot be secured, the display circuit 208 displays a question whether the throughput of the PC function can be lowered, and, if the button 108 is depressed in response, the throughput of the PC function is lowered and the selected throughput is displayed by the display circuit 204. On the other hand, if the button 108 is not depressed within a predetermined time in response to the displayed question, the transmission speed of the communicating function is lowered in succession from the registered minimum transmission speed of the communicating function.

Figure 17:
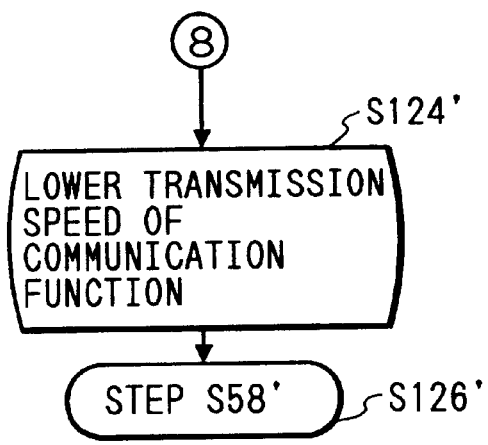
Figure 16:
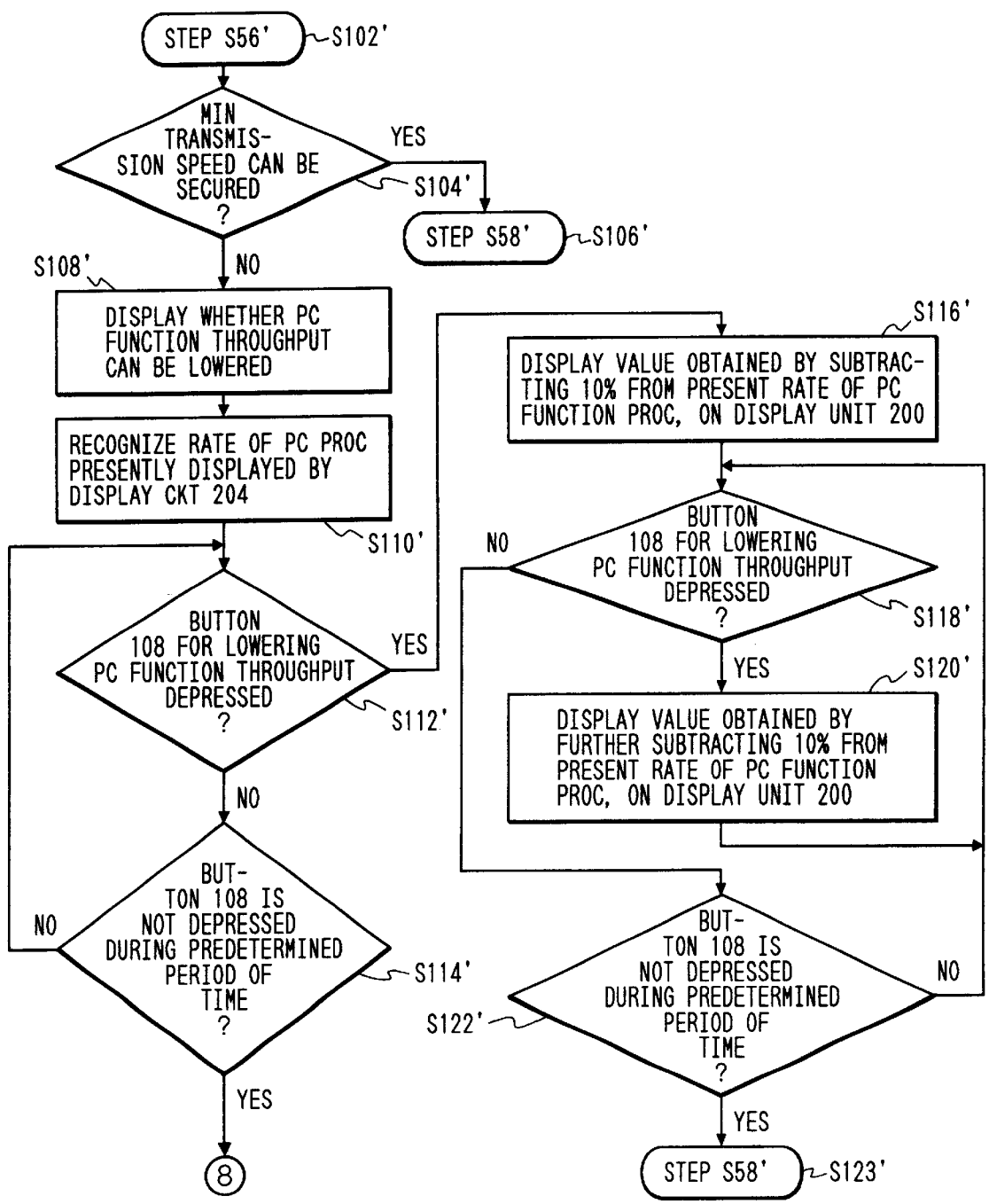

The control sequence of this embodiment is described in the following, with reference to FIGS. 16 and 17.

A step S102' corresponds to the step S56' in FIG. 12.

A next step S104' discriminates whether the minimum transmission speed of the communicating function, displayed on the display unit 200 by the display circuit 206, can be secured, and the sequence proceeds to a step S106' (step S58' in FIG. 12) or S108' respectively if said speed can be secured or not.

The step S108' causes the display circuit 208 to display a question whether the throughput of the PC function can be lowered.

A next step S110' recognizes the current throughput of the PC function, displayed on the display unit 200 by the display circuit 204.

Then a step S112' discriminates whether the button 108, for permitting the lowering of the throughput of the PC function, has been depressed, and, if depressed, the sequence proceeds to a step S116' to lower the throughput by 10% from that recognized in the step S110' and to cause the display circuit 204 to display thus lowered throughput on the display unit 200. On the other hand, if the button 108 has not been depressed, the sequence proceeds to a step S114'.

The step S114' discriminates whether the button 108 has been depressed within a predetermined time, and the sequence proceeds to a step S112' or S124' respectively if the button 108 has been depressed or not.

A step S118' discriminates, as in the step S112', whether the button 108 has been depressed, and, if depressed, the sequence proceeds to a step S120' to further lower the throughput of the PC function by 10%. This procedure is repeated until a desired throughput is reached. If the button 108 has not been depressed, the sequence proceeds to a step S122'.

The step S112' discriminates, as in the step S114', whether the button 108 has been depressed within a predetermined time, and the sequence proceeds to a step S123' (step S58' in FIG. 12) or S118' respectively if the button 108 has been depressed or not.

A step S124' lowers the transmission speed of the communicating function below the registered minimum transmission speed, in order to secure the current throughput of the PC function, displayed by the display circuit 204 on the display unit 200, and the sequence proceeds to a step S126' (step S58' in FIG. 12).

According to the fifth embodiment, as explained in the foregoing, if the registered minimum transmission speed of the communicating function cannot be secured, such minimum transmission speed is secured by the lowering of the throughput of the PC function according to the instruction of the user. Also in case the instruction to lower the throughput of the PC function is not given, the current throughput of the PC function is secured by the lowering of the transmission speed of the communicating function below the registered minimum transmission speed.

Also in the fifth embodiment, the control sequence of the steps S104' to S122' may be conducted during the transmission of the image of a next page.

In the foregoing embodiments personal computers have been described with a communicating function, but it is also possible to connect a communication board to a personal computer and to effect transmission and reception of data by the communication board.

Also in the foregoing embodiments, for securing the throughput of the PC function, there is employed the lowering of the transmission speed of the communicating function or the flow control. Such method allows to secure the desired throughput for the PC function, but such lowering of the transmission speed of the communicating function or such flow control extends the time required for communication. Also in case the process by the PC function is executed for a prolonged period, there is elongated the time of parallel process by the PC function and by the communicating function.

These drawbacks are taken into consideration in a sixth embodiment which is described in the following.

FIG. 18 is a block diagram of a data processing apparatus with communicating function, constituting the sixth embodiment of the present invention.

The apparatus shown in FIG. 18 is provided, in addition to the aforementioned components, with a DMA controller, which, in response to an instruction from the control circuit 1, effects the control of data transfer, and, when the data transfer is completed, informs the control circuit 1 of such completion.

FIG. 19 is a flow chart showing the control sequence of the sixth embodiment, wherein the processes of the PC function and the communicating function are the same as those in the first embodiment.

At first a step S4' discriminates whether a process by the PC function is to be executed, and, if not, the sequence proceeds to a step S6' to discriminate whether a process by the communicating function is to be executed. If the step S6' identifies that a process by the communicating function is not to be executed, the sequence waits until a process by the PC function or by the communicating function is to be executed. On the other hand, if the step S6' identifies that a process by the communicating function is to be executed, the sequence proceeds to a step S8' to execute the process by the communication function in the normal manner.

On the other hand, if the step S4' identifies that a process by the PC function is to be executed, the sequence proceeds to a step S10' to discriminate whether a process by the communicating function is to be executed. If not, the sequence proceeds to a step S12' to execute the process by the PC function in the normal manner.

On the other hand, if the step S10' identifies that a process by the communicating function is to be executed, the sequence proceeds to a step S14' to discriminate whether the throughput of the PC process is "quick process". If so, a step S16' switches the encoding method in the communication process to the MH encoding, and reduces the resolving power in the execution of the processes of the communicating function and of the PC function. Also, the switched encoding method and resolving power are displayed on the display unit 200.

On the other hand, if the step S14' identifies that the throughput of the PC function is not "quick process", a step S18' discriminates whether the throughput is "ordinary". If so, a step S20' executes the processes by the communication and the PC function, by reducing the resolving power of the image in the communication process. Also, the switched resolving power is displayed on the display unit 200.

In case the step S18' identifies that the throughput of the PC function is not "ordinary", the throughput is "slow process", so that a step S22' executes the processes by the communication and by the PC function, by switching the encoding to the MH encoding method. Also, the switched encoding method is displayed on the display unit 200.

The above-explained switching of the encoding method from MH method to MR method simplifies the process, thus allowing to reduce the time required for encoding. However, as the data amount increases somewhat in comparison with that in the MR encoding, a DMA controller 36 is provided in the present embodiment for effecting the control of the data transmission and reception, in order to reduce the time of parallel processing of the PC function and the communicating function in the control circuit 1. Also, the reduction of the resolving power significantly reduces the data amount, so that the time required for transmission is reduced even when the transmission speed is lowered.

It is also possible to select in advance, for example by the keyboard 100, whether the switching of the encoding method and/or the reduction of the resolving power is to be executed, and to execute such switching of the encoding method and/or the reduction of the resolving power according to such pre-selection.

As explained in the foregoing, the sixth embodiment allows to reduce the time of parallel processing of the PC function and the communicating function in the control circuit 1, even when the transmission speed in the communicating function is lowered in order to secure the throughput of the PC function.

Also in order to secure the throughput of the PC function, it is also possible, instead of lowering the transmission speed of the communicating function, to switch either the encoding method or the resolving power, thereby alleviating the burden of the control circuit 1.

As described in the foregoing, the present invention allows to properly control the throughputs of the communication and the PC function according to the desire of the user or the current status of the apparatus.

The present invention has been described with reference to the preferred embodiments thereof, but it is to be understood that the present invention is by no means limited to such embodiments and is subject to various modifications within the scope and spirit of the appended claims.

What is claimed is:

1. A data processing apparatus comprising:
   data process means for effecting a data process such as calculations;
   data communication means for effecting a data transmission or reception process in accordance with a communication mode;
   control means for controlling said data process means and said data communication means such that the process by said data process means and the process by said data communication means are effected in a time sharing manner;
   selection means for selecting a proper parameter relating to processing efficiency of said data communication means, in case of effecting the two processes by said control means in the time sharing manner; and
   setting means for setting whether or not it is permitted that throughout of the process by said data processing means is made smaller than a predetermined level,
   wherein said selection means is set not to be permitted by said setting means, and selects a parameter which is possible to keep the predetermined level, in a case where the predetermined level can not be kept by said control means.

2. An apparatus according to claim 1, wherein said selection means selects a transmission speed of data in a case where a data communication is effected by said data communication means.

3. An apparatus according to claim 1, wherein said data communication means effects a data communication by using a high-speed modem capable of effecting a data transmission at a speed of at least 28800 bits per seconds.

4. A control method of a data processing apparatus, comprising:
   a data process step of effecting a data process such as calculations;
   a data communication step of effecting a data transmission or reception process in accordance with a communication mode;
   a control step of controlling said data process step and said data communication step such that the two processes are effected in a time sharing manner;
   a selection step of setting a proper parameter for controlling processing efficiency of said data communication step, in case of effecting the two processes in the time sharing manner; and
   a setting step for setting whether or not it is permitted that throughout of the process in said data processing step is made smaller than a predetermined level,
   wherein said selection step is set not to be permitted in said setting step, and selects a parameter which is possible to keep the predetermined level, in a case where the predetermined level can not be kept in said control step.

5. A method according to claim 4, wherein, in said selection step, a transmission speed of data is selected in case of effecting a data communication in said data communication step.

6. A storage medium which stores a program comprising:
   a data process step of effecting a data process such as calculations;
   a data communication step of effecting a data transmission or reception process in accordance with a communication mode;
   a control step of controlling said data process step and said data communication step such that the two processes are effected in a time sharing manner; and
   a selecting step of selecting proper parameter for controlling processing efficiency of said data communication step, in case of effecting the two processes in the time sharing manner; and
   a setting step for setting whether or not it is permitted that throughout of the process in said data processing step is made smaller than a predetermined level,
   wherein said selection step is set not to be permitted in said setting means, and selects a parameter which is possible to keep the predetermined level, in a case where the predetermined level can not be kept in said control step.

7. A medium according to claim 6, wherein, in said program, in said selection step a transmission speed of data is selected in case of effecting a data communication in said communication step.

8. A program stored in a storage medium, comprising:
   a data process step of effecting a data process such as calculations;
   a data communication step of effecting a data transmission or reception process in accordance with a communication mode;
   a control step of controlling said data process step and said data communication step such that the two processes are effected in a time sharing manner;
   a selection step of selecting a proper parameter for controlling processing efficiency of said data communication step, in case of effecting the two processes in the time sharing manner; and
   a setting step for setting whether or not it is permitted that throughout of the process in said data processing step is made smaller than a predetermined level,
   wherein said selection step is set not to be permitted in said setting step, and selects a parameter which is possible to keep the predetermined level, in a case where the predetermined level can not be kept in said control step.

9. A program according to claim 8, wherein, in said selection step, a transmission speed of data is selected in case of effecting a data communication in said data communication step.

* * * * *

UNITED STATES PATENT AND TRADEMARK OFFICE
CERTIFICATE OF CORRECTION

PATENT NO. : 6,332,162 B1  
DATED : December 18, 2001  
INVENTOR(S) : Takehiro Yoshida It is certified that error appears in the above-identified patent and that said Letters Patent is hereby corrected as shown below:

Title page,
Item [*] Notice, insert -- This patent issued on a continued prosecution application filed under 37 CFR 1.53(d), and is subject to the twenty year patent term provisions of 35 U.S.C 154(a)(2). --.

Drawings,
Sheet 14, FIG. 14, "RERFORM" should read -- PERFORM --.

Column 3,
Line 54, "a" should be deleted.

Column 4,
Line 13, "(orhtogonal" should read -- (orthogonal --; and
Line 14, "v34" should read -- V34 --.

Column 6,
Line 35, "disciriminates" should read -- discriminates --.

Column 15,
Lines 33 and 64, "of" should be deleted; and
Line 38, "can not" should read -- cannot --;
Line 47, "28800 bits" should read -- 28,800 bits --.

Column 16,
Lines 4, 31 and 58, "can not" should read -- cannot --;
Lines 26 and 53, "of" should be deleted.

Signed and Sealed this

Twenty-ninth Day of July, 2003

JAMES E. ROGAN
*Director of the United States Patent and Trademark Office*